United States Patent [19]

Chorkey

[11] Patent Number: 4,598,736

[45] Date of Patent: Jul. 8, 1986

[54] SOLENOID OPERATED VALVE WITH BALANCING MEANS

[76] Inventor: William J. Chorkey, 34300 Lyncroft, Farmington, Mich. 48024

[21] Appl. No.: 677,214

[22] Filed: Dec. 3, 1984

[51] Int. Cl.$^4$ ............................................. F15B 13/044
[52] U.S. Cl. ................................ 137/625.65; 137/270; 137/625.26; 251/129.03; 251/129.07; 251/129.21
[58] Field of Search .............. 137/270, 625.26, 625.65; 251/139, 141, 282, 129.07, 129.21, 129.03

[56] References Cited

U.S. PATENT DOCUMENTS

| | | | |
|---|---|---|---|
| 2,934,090 | 4/1960 | Kenann et al. | 251/282 X |
| 3,016,920 | 1/1962 | Thomsen et al. | 251/282 X |
| 3,236,494 | 2/1966 | Frantz | 251/139 X |
| 3,985,333 | 10/1976 | Paulsen | 251/282 X |
| 4,026,325 | 5/1977 | Loveless | 137/625.26 |

FOREIGN PATENT DOCUMENTS

| | | |
|---|---|---|
| 360978 | 11/1931 | United Kingdom . |
| 372479 | 5/1932 | United Kingdom . |
| 601172 | 4/1948 | United Kingdom . |
| 868896 | 5/1961 | United Kingdom . |
| 889987 | 2/1962 | United Kingdom . |
| 1338270 | 11/1973 | United Kingdom . |
| 1413112 | 11/1975 | United Kingdom . |
| 1491062 | 11/1977 | United Kingdom . |
| 1505814 | 3/1978 | United Kingdom . |
| 2094441A | 9/1982 | United Kingdom . |

Primary Examiner—Gerald A. Michalsky
Attorney, Agent, or Firm—Irvin L. Groh

[57] ABSTRACT

A balanced solenoid operated valve having a balanced solenoid plunger, and the valve can be made as a three-way valve or a four-way valve. In the four-way valve embodiment the solenoid plunger balancing means also functions as a sliding spool valve for controlling the flow of fluid through the valve between two valve ports. The four-way valve can be made with a valve body comprising an upper member and a lower member, and wherein the lower member can be adjusted relative to the upper member to vary the locations of the valve ports relative to each other.

8 Claims, 23 Drawing Figures

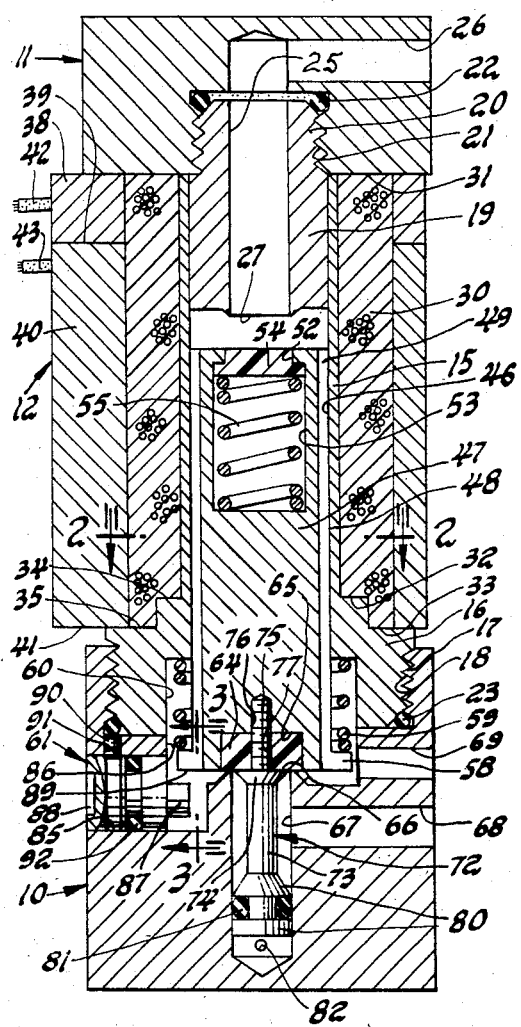
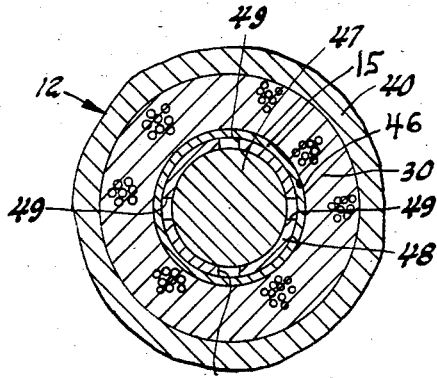
Fig.1
Fig.2
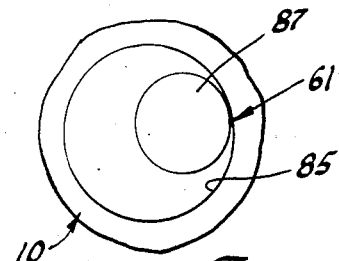
Fig.3
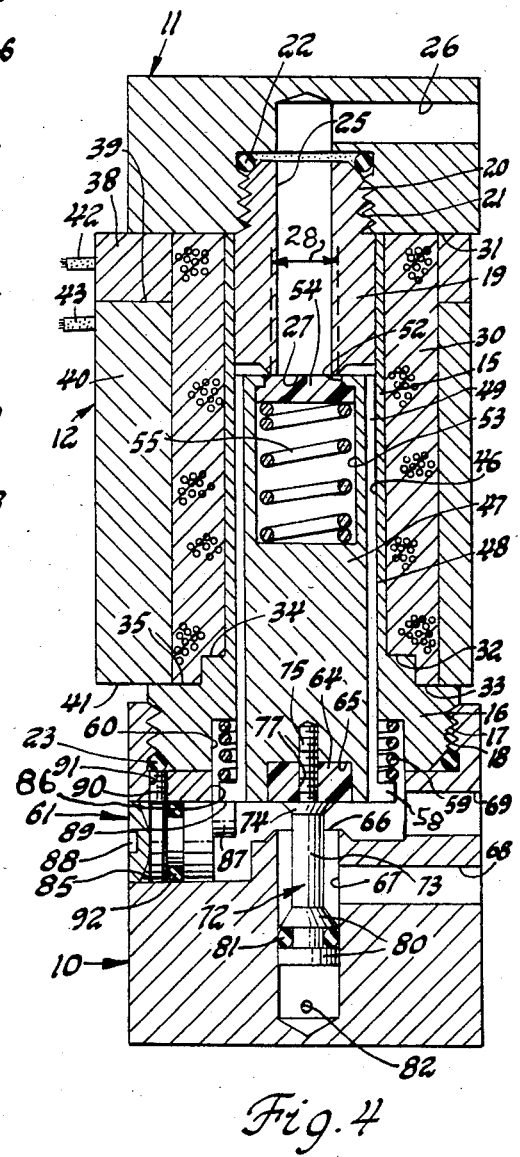
Fig.4

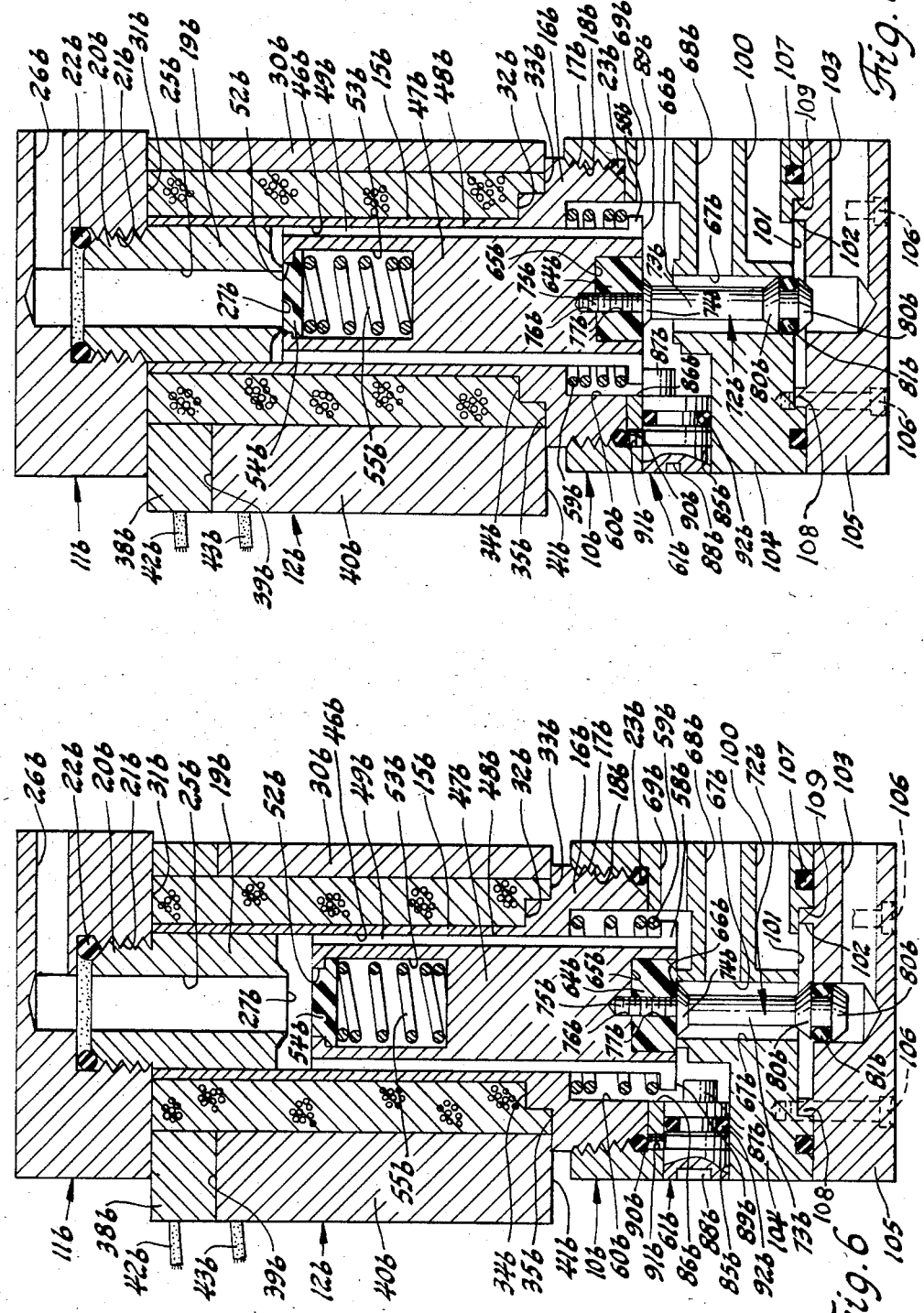

SOLENOID OPERATED VALVE WITH BALANCING MEANS

BACKGROUND OF THE INVENTION

1. Technical Field

The field of art to which this invention pertains may be generally located in the class of devices relating to valves. Class 137, Fluid Handling, United States Patent Office Classification, appears to be the applicable general area of art to which the subject matter similar to this invention has been classified in the past.

2. Background Information

It is known in the valve art to provide three-way and four-way valves for controlling the flow of fluid, either air or hydraulic oil, to a device which is to be controlled by fluid under pressure, as for example, another valve or a fluid cylinder. Heretofore, solenoid operated valves required a large solenoid thrust when the valve was used to control high pressure fluids, to overcome the spring pressure required to maintain the solenoid plunger in the closed position. The problem solved by the present invention is the elimination of the need of a high solenoid thrust in a solenoid operated valve, by the provision of a unique balancing means which balances the solenoid plunger.

An example of a prior art solenoid operated, three-way valve with pressure balancing is illustrated in U.S. Pat. No. 3,865,140. However, the solenoid operated valve disclosed in this patent does not provide a direct balancing means for the solenoid plunger or armature, and it involves a complicated hydraulic balancing structure which includes a tandem valving operation, valving orifices, and other associated structures.

SUMMARY OF THE INVENTION

In accordance with the present invention, a balanced three-way and four-way solenoid type valve is provided which is small in structure. The solenoid operated valves, with balancing means, made in accordance with the invention may be used for separate three-way or four-way valve control functions, or they may be used as a pilot valve in combination with other valves, such as a three-way or four-way valve having a sliding main valve spool, for controlling the same.

The present invention overcomes the aforementioned problem of balancing a solenoid valve by providing a balancing means which is directly attached to the solenoid plunger or armature so as to balance the solenoid when it is in a de-energized or energized position. In a four-way valve made in accordance with the principles of the present invention, the balancing means is attached directly to the solenoid plunger or armature, and it also functions as a sliding spool valve for controlling the flow of fluid through the valve between two valve ports. The unique structure of the solenoid operated valve, with balancing means, provides a valve structure which can be made to a small size because of the balanced solenoid structure. The unique feature of the four-way valve made in accordance with the present invention is that it can be made with a valve body that comprises two parts, and wherein the lower body member can be rotated relative to the upper body member to provide adjustability for adjusting the relative positions of the cylinder, exhaust and inlet ports.

BRIEF DESCRIPTION OF THE DRAWINGS

FIG. 1 is an elevation section view of a three-way solenoid operated valve with balancing means, made in accordance with the present invention, and showing the valve in a de-energized position.

FIG. 2 is a fragmentary, horizontal section view of the valve structure illustrated in FIG. 1, taken along the line 2—2 thereof, and looking in the direction of the arrows.

FIG. 3 is a fragmentary, elevation view, with parts removed, of the valve structure illustrated in FIG. 1, taken along the line 3—3 thereof, and looking in the direction of the arrows.

FIG. 4 is an elevation section view, similar to FIG. 1, of the three-way valve illustrated in FIG. 1, and showing the three-way valve in an energized position.

FIG. 6 is an elevation section view of a four-way solenoid operated valve with balancing means, made in accordance with the present invention, and showing the valve in a de-energized position.

FIG. 7 is an elevation section view, similar to FIG. 6, and showing the four-way valve of FIG. 6 in an energized position.

DESCRIPTION OF THE PREFERRED EMBODIMENTS

Figure 5:
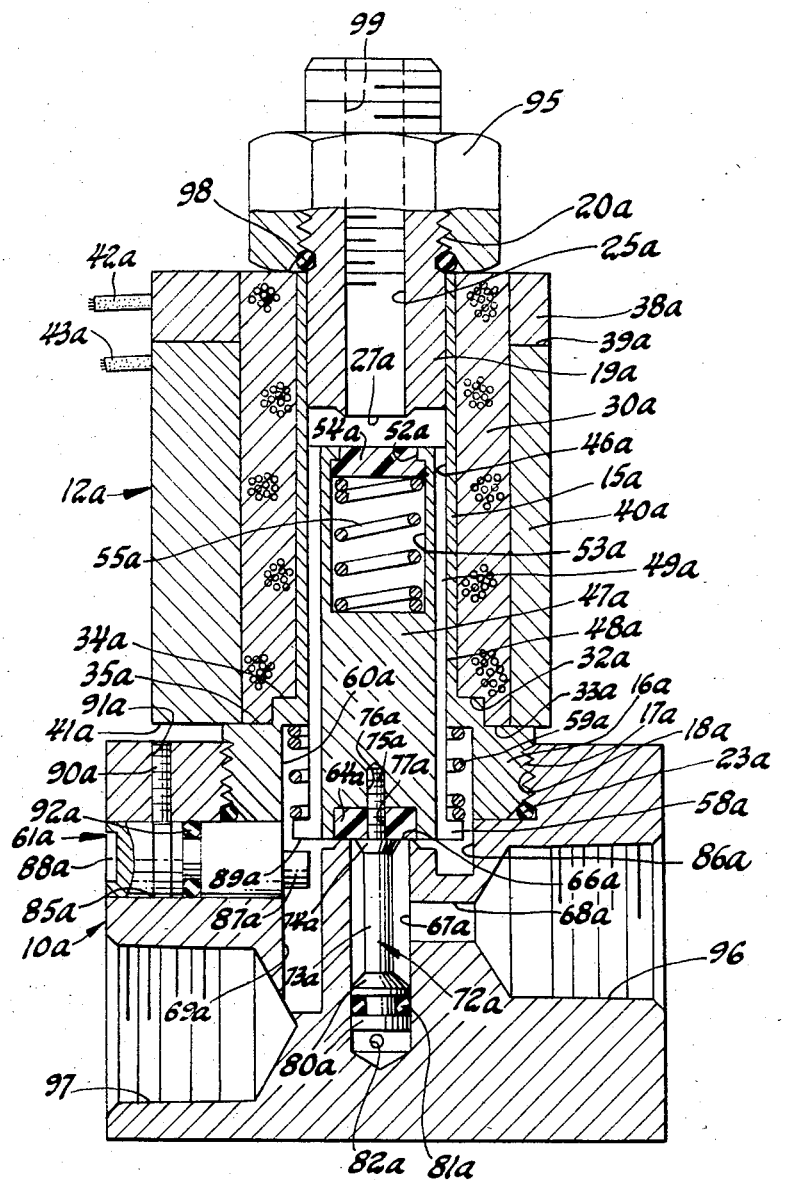
FIG. 5 is an elevation section view, similar to FIG. 1, and showing the same three-way valve structure as illustrated in FIG. 1, but showing the valve provided with a pole piece exhaust port that is threaded for connection to an exhaust pipe.

Referring now to the drawings, and in particular to FIG. 1, the numeral 10 generally designates a three-way valve body made in accordance with the invention. The numeral 12 designates a solenoid operator, and the numeral 11 generally designates a pole piece exhaust port adaptor for holding the various parts of the solenoid operator 12 together. As shown in FIGS. 1 and 2, the solenoid operator 12 includes a cylindrical solenoid plunger guide tube 15 which has an enlarged, integral lower end 16 that is threaded on the outer periphery thereof, as indicated by the numeral 17. The valve body 10 is provided on its upper end with a downwardly and inwardly extended recess which is internally threaded, as indicated by the numeral 18, for the threaded reception of the threaded portion 17 of the lower end 16 of the solenoid plunger cylindrical guide tube 15.

As shown in FIG. 1, a cylindrical pole piece 19 has its lower end slidably mounted in the upper end of the plunger guide tube 15, and the upper end thereof extends above the upper end of the guide tube 15, and it is exteriorly threaded, as indicated by the numeral 20. The threaded upper end 20 of the pole piece 19 is adapted to be threadably mounted in a threaded bore 21 which is formed in the exhaust port adaptor 11, on the lower side thereof. A suitable O-ring seal 22 is mounted in the threaded bore 21 for sealing against leakage of fluid out through the threaded connection between the threaded pole piece end 20 and the threaded bore 21. A suitable O-ring seal 23 is also mounted in the threaded bore 18 for sealing against fluid leakage through the threaded connection between the lower threaded end 17 of the solenoid plunger guide tube 15 and the threaded bore 18 in the valve body 10.

As shown in FIG. 1, the pole piece 19 has formed therethrough a longitudinally extended, centrally disposed, tubular exhaust passage 25 which communicates with a similar exhaust passage 26 in the exhaust port adaptor 11. The outer end of the exhaust passage 26 comprises an exhaust port which is adapted to exhaust to the atmosphere, or be connected to a suitable exhaust system for conveying fluid exhausting through the passageway 26 to a desired place or position. The lower or inner end of the pole piece exhaust passage 25 terminates at an annular, sharp edged poppet valve seat 27.

The solenoid operator 12 includes a conventional solenoid coil 30 which is disposed around the solenoid plunger cylindrical guide tube 15. The upper end of the solenoid coil 30 is seated against the underside 31 of the exhaust port adaptor 11. The lower end of the solenoid coil 30 is provided with a stepped lower end surface, as indicated by the numerals 32 and 33. As shown in FIG. 1, the stepped lower end surface portions 32 and 33 of the solenoid coil 30 are adapted to be seated on the stepped upper surface portions 34 and 35 of the lower end 16 of the solenoid plunger cylindrical guide tube 15.

The solenoid operator 12 includes a flux ring 38 which is shown in FIG. 1 as being mounted around the upper end of the solenoid coil 30, with its lower end seated on the upper end 39 of the cylindrical solenoid housing 40, and its upper end being seated against the lower end 31 of the exhaust port adaptor 11. As shown in FIG. 1, the lower end 41 of the solenoid housing 40 is seated on the upper stepped surface portion 35 of the lower end 16 of the solenoid plunger guide tube 15. It will be seen that the exhaust port adaptor 11 functions as a retainer when it is threadably moved into a tight position against the upper ends of the solenoid coil 30 and the flux ring 38, to hold these two members and the solenoid housing 40 securely in place on the stepped upper end portions 34 and 35 of the solenoid guide tube lower end 16. The numerals 42 and 43 in FIG. 1 designate the usual electrical power lead wires for the solenoid coil 30.

As shown in FIGS. 1 and 2, the solenoid plunger or armature 47 carries a cylindrical sleeve 48 which is fixed thereto by staking. The solenoid plunger 47 and sleeve 48 are slidably mounted within the cylindrical bore or interior 46 of the solenoid plunger guide tube 15. As shown in FIGS. 1 and 2, a plurality of longitudinally extended exhaust slots 49 are formed axially through the plunger sleeve 48, for the entire length of the sleeve 48. The solenoid guide tube 15, with its integral lower end 16, comprises a magnetic frame for the solenoid plunger 47.

As shown in FIG. 1, the upper end of the solenoid plunger 47 has an inwardly extended bore 52 which communicates with an enlarged bore 53 that extends further inwardly and downwardly in the plunger 47, as viewed in FIG. 1. A valve seal 54, having an inverted T-shaped in vertical cross section body, as shown in FIG. 1, is seated in the bore 52, with the enlarged T-head seated on the shoulder formed by the junction of the bores 52 and 53. A suitable coil spring 55 is mounted in the bore 53 with its upper end in seating engagement against the poppet seal 54, and the lower end seated against the inner end wall of the bore 53. The poppet valve seal 54 is made from any suitable material, as for example, an elastomeric material.

As shown in FIG. 1, the lower end of the solenoid plunger sleeve 48 is provided with a radial, outwardly extended, integral flange 58 on which is seated the lower end of a plunger return spring 59. The lower end of the plunger 47 and sleeve 48 with the flange 58 and the return spring 59 are movably mounted in an enlarged diameter axial recess 60, that is formed in the lower end 16 of the solenoid plunger guide tube 15. The recess or bore 60 communicates with the lower end of the smaller diameter bore 46. The upper end of the return spring 59 is seated against the shoulder formed by the intersection of the bore 46 and the enlarged bore 60. The return spring 59 normally biases the solenoid plunger 47 downwardly, so as to engage the poppet valve seal 64 that is carried in the lower end of the solenoid plunger 47 into seating engagement on the poppet valve seat 66 which is formed in the valve body 10, as described more fuly in detail hereinafter. The numeral 61 generally designates a manual operator for manually moving the solenoid plunger 47 upwardly to move the poppet seal 64 off of the seat 66, as desired.

As shown in FIG. 1, the valve body 10 is provided with an axially extended bore 67 which is positioned axially of the solenoid plunger 47. The axial bore 67 extends downwardly into the valve body 10 from the poppet valve seat 66. An inlet passage 68 is formed through the valve body 10, and its inner end communicates with the axial bore 67, and the outer end thereof communicates with the exterior of the valve body 10 and functions as an inlet port. It will be understood that the inlet passage 68 would be connected to a suitable source of fluid under pressure, as for example, a source of pressurized air. A cylinder passage 69 is also formed through the valve body 10 in a position above the inlet passage 68. The cylinder passage 69 communicates at its inner end with the bore 86 in the valve body 10. The bore 86 communicates at its upper end with the bore 60 in the solenoid plunger guide tube lower end 16. The cylinder passage 69 also functions as a cylinder port for connection to a device to be supplied with fluid under pressure for operating the same.

As shown in FIG. 1, a solenoid counter-balancing means, generally indicated by the numeral 72 is movably mounted in the axial bore 67 for axial movement therein. The solenoid counter-balancing means 72 comprises an elongated counter-balancing spool member, which includes an elongated shaft 73 that is provided with an integral, enlarged, annular flange 74 on the upper end thereof, as viewed in FIG. 1. A threaded shaft 75 is integrally formed on the upper end of the shaft flange 74, as viewed in FIG. 1. The threaded shaft 75 is mounted through a bore 77 in the poppet valve seal 64, and it extends into threaded engagement with an aligned threaded bore 76 in the lower end of the solenoid plunger 47. When the shaft threaded end 75 is threaded firmly into place, the annular flange 74 seats against the poppet valve seal 64 in a central position and inwardly from the portion of the seal which engages the annular poppet valve seat 66.

As viewed in FIG. 1, the counter-balancing means shaft 73 is provided at its lower end with a pair of integral, longitudinally spaced apart flanges 80, between which is operatively mounted an O-ring seal 81 for sliding, sealing engagement with the surface of the axial bore 67. A vent hole 82 is formed through the valve body 10 to communicate the lower end of the bore 67, below the lower flange 80, on the shaft 73, with the exterior of the valve body 10.

It will be seen, that the valve illustrated in FIG. 1 is in the de-energized position. As shown in FIG. 1, the solenoid plunger 47 is in a balanced condition since the diameter at the lower end of the elongated counter-balancing shaft seal 81 is the same as the diameter of the poppet valve seat 66 which is closed by the poppet valve seal 64. The last described counter-balancing action permits the solenoid operator 12 to be provided with a return spring 59 which has a light thrust action since it does not have to overcome the pressure of the fluid in the bore 67 in order to hold the poppet seal 64 in position on the poppet valve seat 66 when the valve is in the de-energized position.

As shown in FIGS. 1 and 3, the valve body 10 is provided with a transverse bore 85 in which is rotatably mounted a manual operator, generally indicated by numeral 61. The manual operator 61 comprises a cylindrical body which is rotatably mounted in the bore 85, and which has a slot 88 in the outer end thereof for the insertion of a tool to rotate the operator 61. The manual operator 61 has integrally formed on the inner end thereof an eccentrically mounted cylindrical cam 87 which is adapted to move upwardly and seat against the bottom 89 of the flange 58 on the solenoid plunger 47 when the manual operator 61 is rotated in a direction to move the cam member 87 upwardly into engagement with the flange 58. A set screw 90 is threadably mounted in a threaded bore 91, which is formed in the valve body 10, and which extends longitudinally downward, as viewed in FIG. 1, into the bore 85. The lower end of the set screw 90 is adapted to be engaged in a peripheral groove formed on the outer surface of the cylindrical body of the manual operator 61 so as to hold the manual operator 61 against longitudinal movement, but permit the manual operator 61 to be rotated. The manual operator 61 is provided with a suitable O-ring seal 92 which is mounted in a peripheral groove around the periphery thereof.

When the valve illustrated in FIG. 1 is in the deenergized position shown therein, fluid under pressure entering the inlet passage 68, passes into the axial bore 67 and is prevented from flowing into the cylinder passage 69 by the lower poppet valve seal 64 being seated on the valve seat 66. The fluid under pressure acts with equal pressure, on the bottom end flanges 80 and seal 81 of the counterbalancing means 72, and on the poppet valve seal 64 to provide a balanced solenoid plunger 47 in the position shown in FIG. 1. In the position shown in FIG. 1, the cylinder passage 69 is connected to the exhaust passage 26, by a passageway connecting the bores 60 and 86, and through the slots 49, the bore 46 at the upper end of the solenoid plunger 47, and the passage 25 which connects with the exhaust passage 26.

When the solenoid operator 12 is energized, the solenoid plunger 47 moves upwardly so as to lift the lower poppet valve seal off of the lower poppet valve seat 66, and seat the upper poppet valve seal 54 against the upper poppet valve seat 27. In the position shown in FIG. 4, the exhaust passageway from the cylinder passage 69 to the exhaust passage 26 is closed. However, pressurized fluid is allowed to flow from the inlet passage 68 and through the axial bore 67 and the open lower poppet valve seat 66 and through the bore 86 which communicates with the cylinder passage 69. When the solenoid operator 12 is de-energized, the solenoid plunger 47 is returned to the de-energized or initial position shown in FIG. 1 by the action of the return spring 59.

FIG. 5 discloses a three-way valve which is substantially similar to the three-way valve illustrated in FIGS. 1 through 4, but which is provided with threaded ports for piped connections. The parts of the embodiment of FIG. 5 which are the same as the parts of the first valve embodiment of FIGS. 1 through 4 have been marked with the same reference numerals followed by the small letter "a". In the embodiment shown in FIG. 5, the exhaust adaptor 11 employed in the embodiment of FIG. 1 has been replaced by a threadably mounted lock nut 95 which is mounted on the external threaded portion 20a of the pole piece 19a, and which functions to secure the various parts of the solenoid operator 12a in position in the same manner as the exhaust adaptor 11 of the first embodiment of FIGS. 1 through 4. A suitable O-ring seal 98 is operatively mounted within the nut 95 and around the threaded portion 20a on the pole piece 19a, in a position adjacent the upper end of the solenoid plunger guide tube 15. The pole piece 19a is provided with an internally threaded outlet passage 99, at the upper or extreme outer thereof end, which communicates with the upper end of the exhaust passage 25a.

The pressurized fluid inlet passage 68a communicates at its outer end with an enlarged threaded inlet port 96. The cylinder passage 69a communicates at its outer end with a threaded cylinder port 97.

The three-way valve embodiment of FIG. 5 functions in the same manner as described hereinbefore for the three-way valve embodiment of FIGS. 1 through 4.

FIGS. 6 and 7 disclose a four-way valve embodiment made in accordance with the invention. The parts of the four-way valve illustrated in FIGS. 6 and 7, which are the same as the parts of the three-way valve of the first embodiment of FIGS. 1 through 4 have been marked with the same reference numerals followed by the small letter "b".

In the embodiment of FIGS. 6 and 7, the valve body 10b has been made in two parts, with an upper member being designated by the numeral 104 and a lower member being designated by the numeral 105. The valve body lower member 105 is provided on its upper side with an annular boss or projection 108 which is adapted to be rotatably seated in an annular recess 109 which is formed in the lower side of the valve body upper member 104. The valve body lower member 105 is releasably secured to the valve body upper member 104 by a plurality of suitable machine screws 106 which are adapted to pass through suitable bores in the valve body lower member 105 and extend into threaded bores in the lower end of the valve body upper member 104.

As shown in FIG. 6, a second cylinder passage 100 is formed in the valve body upper member 104 at a position below the inlet passage 68b. The inner end of the second cylinder passage 100 communicates through an opening 101 with a transverse annular chamber 102 which is formed in the boss 108 of the valve body lower member 105. The annular chamber 102 communicates with the axial bore 67b in which is slidably mounted the counter-balancing means 72b.

As shown in FIG. 6, a second exhaust port passage 103 is formed in the valve body lower member 105, and the inner end thereof communicates with the lower end of the axial bore 67b at a position below the counter-balancing means 72. A suitable O-ring seal 107 is operatively mounted in an annular groove on the lower side of the valve body upper member 104, and it sealingly engages the upper surface of the valve body lower member 105.

FIG. 6 shows the four-way valve in a de-energized position, and FIG. 7 shows the four-way valve in the energized position. In the de-energized position shown in FIG. 6, the solenoid plunger 47b is in a balanced condition for the same reasons as described for the first embodiment of FIGS. 1 through 4. The inlet passage 68b admits fluid under pressure into the axial bore 67b, between the poppet seal 64b which is seated on the seat 66b, and the lower end of the counter-balancing means 72b. The fluid under pressure passes from the inlet passage 68b and into the axial bore 67b, and then downwardly through the chamber or passage 102 and through the opening 101, and then through the second cylinder passage 100 to the device to be controlled by the fluid under pressure. The first cylinder passage 69b is connected to the exhaust passage 26b in the same manner as described hereinbefore for the first embodiment of FIG. 1 when it was in the de-energized position. When the solenoid operator 12b is energized, the solenoid plunger 47b moves upwardly to the position shown in FIG. 7, so as to seat the upper poppet valve seal 54b on the poppet valve seat 27b and close the exhaust passage 26b. The first cylinder passage or port 69b is connected through the bore 86b in the valve body upper portion 104 to the axial bore 67b. The fluid under pressure is then allowed to pass from the inlet passage 68b through the last mentioned path into the first cylinder passage 69b for transmission to a device to be controlled by the pressurized fluid. The second cylinder passage or port 100 is connected to the second exhaust passage or port 103 through the opening 101, the recess 102 and the lower end of the axial bore 67b.

It will be seen, that in the embodiment of FIGS. 6 through 7, that the counter-balancing means 72b functions not only as a counter-balancing means but also as a sliding valve spool. When the solenoid operator 12b is de-energized the return spring 59b returns the solenoid plunger 47b back to the initial position shown in FIG. 6 to reverse the flow of fluid through the four-way valve.

The valve body lower member 105 can be rotated from the position shown in FIGS. 6 and 7, so as to move it to a new position. The last mentioned rotative ability of the valve body lower member 105 is provided by the fact that the threaded bore holes in the lower end of the valve body upper member 104 for the machine screws 106 can be so positioned at a desired number of locations as to permit two of the screws 106 to be used to secure the valve body lower member 105 in any adjusted, desired rotative position, in the same manner as described hereinafter for the embodiment disclosed in FIGS. 11 through 23.

Figure 9:
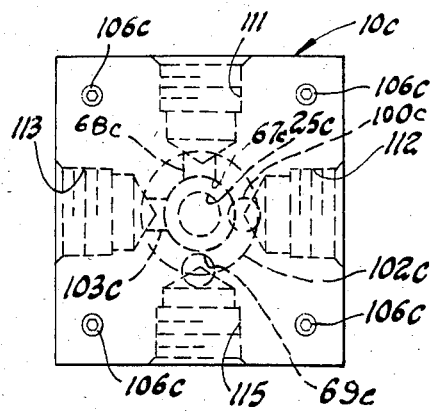
FIG. 9 is a reduced, bottom plan view of the four-way valve illustrated in FIG. 8, taken along the line 9—9 thereof, and looking in the direction of the arrows.
Figure 8:
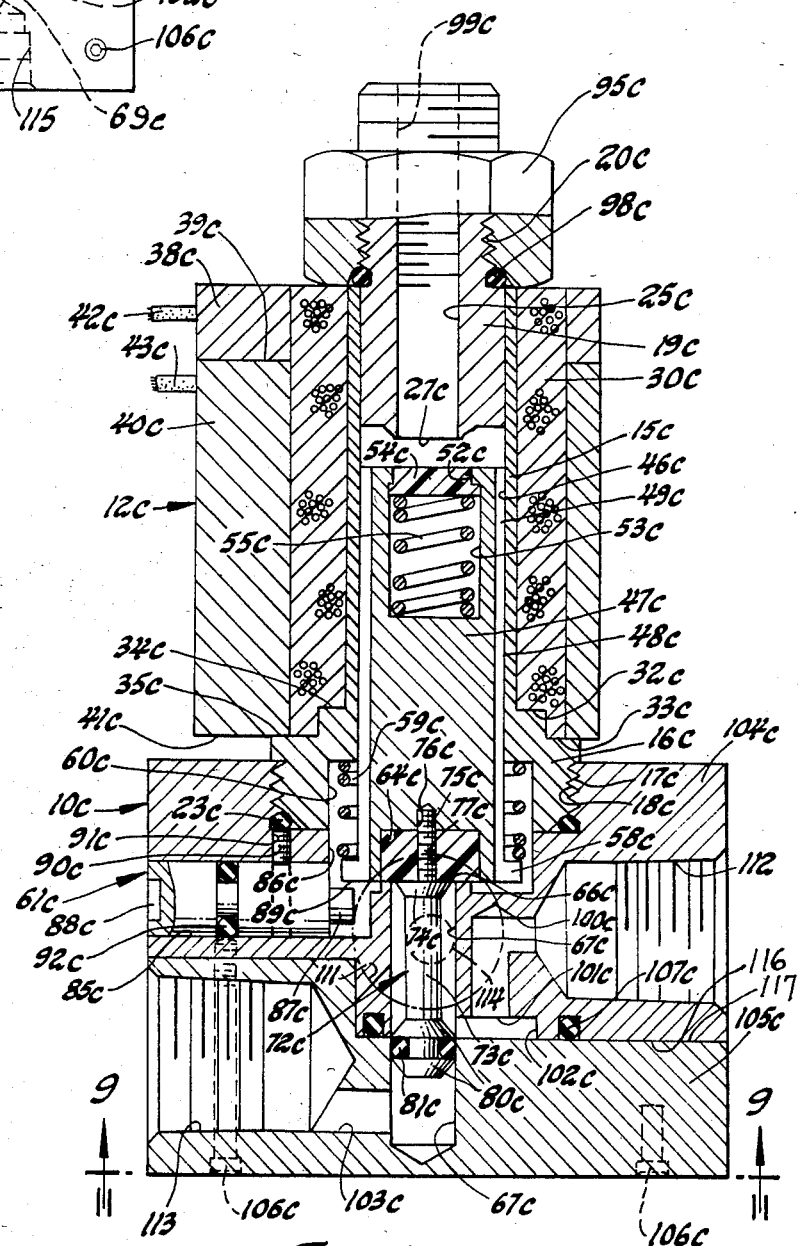
FIG. 8 is an elevation section view, similar to FIG. 6, and showing the four-way valve of FIG. 6 provided with a pole piece exhaust port that is threaded for connection to an exhaust pipe.

FIGS. 8 and 9 illustrate another four-way valve made in accordance with the invention. The parts of the four-way valve shown in FIGS. 8 and 9 which are the same as the first embodiment of FIGS. 1 through 4, the second embodiment of FIG. 5, and the third embodiment of FIGS. 6 through 7, have been marked with the same reference numerals followed by the small letter "c". The difference between the four-way valve embodiment shown in FIGS. 6 and 7 and the four-way valve embodiment shown in FIGS. 8 and 9 is that the cylinder ports, the inlet port and the one exhaust port have been disposed 90 degrees apart from each other, and the exhaust passage in the pole piece 19c is internally threaded, and the pole piece 19c is held in place in the same manner as described hereinbefore by the same lock nut structure employed by the embodiment of FIG. 5.

In the embodiment of FIGS. 8 and 9, the valve body upper member 104c and the valve body lower member 105c are joined along an L-shaped line wherein the numeral 116 indicates the bottom L-shape of the valve body upper member 104c and the numeral 117 indicates the top L-shaped surface of the valve body lower member 105c. The valve body lower member 105c is releasably secured to the valve body upper member 104c by a plurality of suitable machine screws 106c.

As shown in FIG. 8, the number two cylinder passage 100c communicates with a threaded cylinder port 112. The second exhaust passage 103c communicates with a threaded exhaust port 113. The number two cylinder port 112 and the number two exhaust port 113 are disclosed opposite each other, as shown in FIGS. 8 and 9. As shown in FIG. 9, the inlet passage 68c communicates with a threaded inlet port 111 which is disposed opposite to the number one cylinder threaded port 115, which is connected to the number one cylinder passage 69c. The number one cylinder threaded port 115 does not appear in FIG. 8. However, the number one cylinder passage 69c leads upwardly from the threaded cylinder port 115, which is on the same level as the inlet port 111 and upwardly into communication with the bore 86c.

The four-way valve embodiment of FIG. 8 functions in the same manner as the four-way valve embodiment of FIGS. 6 and 7. In the position shown in FIG. 8 the solenoid operator 12c is in the de-energized position and cylinder port 112 is blocked from communication with exhaust port 113 by the counter-balancing and valve spool means 80c and 81c. The cylinder port 115 is open to the exhaust threaded port 99c, while cylinder port 112 is supplied with fluid under pressure from the axial bore 67c which is supplied with fluid under pressure by the threaded inlet port 111. When the solenoid operator 12c is energized, the solenoid plunger 47c moves upwardly to block the exhaust passage or port 99c and open the axial bore 67c to bore 86c and allow fluid pressure to flow to cylinder port 115, while allowing cylinder port 112 to exhaust through exhaust port 113.

Figure 10:
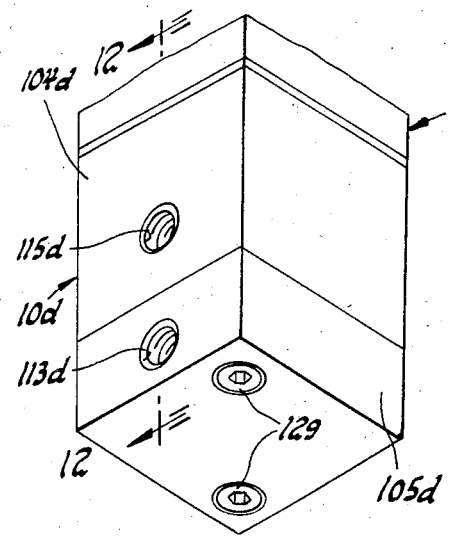
FIG. 10 is a fragmentary, elevation perspective view, with the solenoid operator shown in fragment, of a four-way solenoid operated valve made in accordance with the invention, and which is provided with a valve body having an upper body member and a lower body member and with said upper and lower body members being adjustable, relative to each other, to position the ports therein in different positions.
Figure 11:
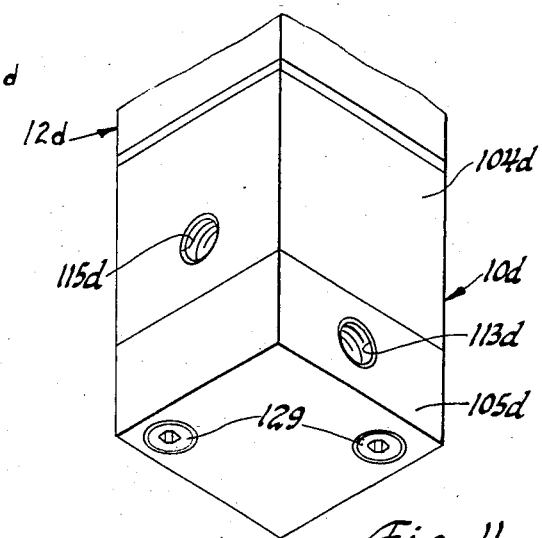
FIG. 11 is an elevation perspective view, similar to FIG. 10, and showing the lower body member rotated to a position differing from that shown in FIG. 10.

FIGS. 10 through 23 illustrate another embodiment of the invention which comprises a four-way piped valve that has the valve body made in two parts, with an upper body member and a lower body member, and wherein the lower body member may be rotated to different positions, so that the various ports may be used in different optimum positions without the necessity of providing a valve with a unitary valve body and having the ports in special positions. The parts of the four-way valve embodiment illustrated in FIGS. 10 through 23 which are the same as the parts of the previously described embodiments have been marked with the same reference numerals followed by the small letter "d". As illustrated in FIGS. 10 and 11, the solenoid operator 12d would be of the same structure and function as employed in the previously described embodiments. The valve body upper member 104d is block-shaped, and mates with a similar block-shaped valve body lower member 105d.

Figure 12:
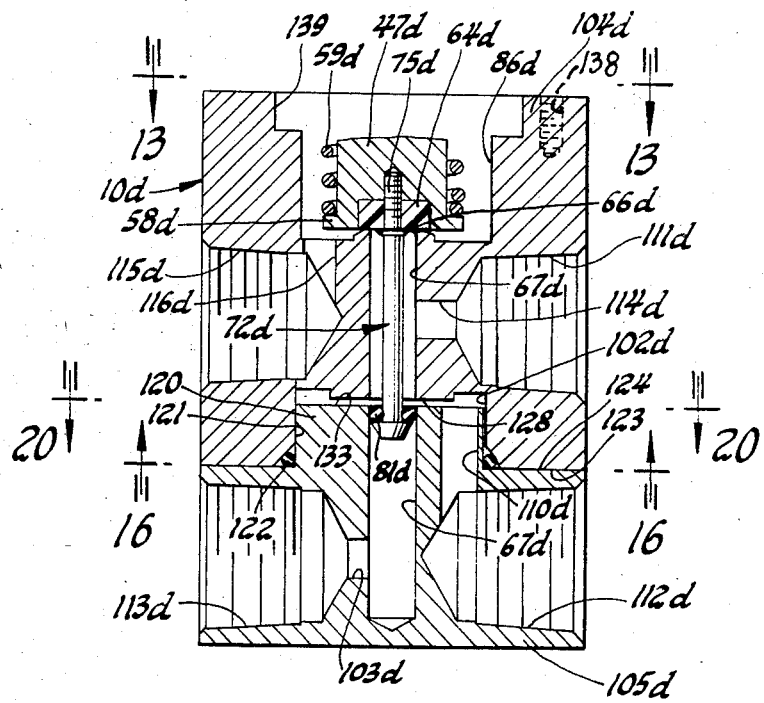
FIG. 12 is an elevation section view, with parts removed, of the four-way valve structure illustrated in FIG. 10, taken along the line 12—12 thereof, and looking in the direction of the arrows.
Figure 13:
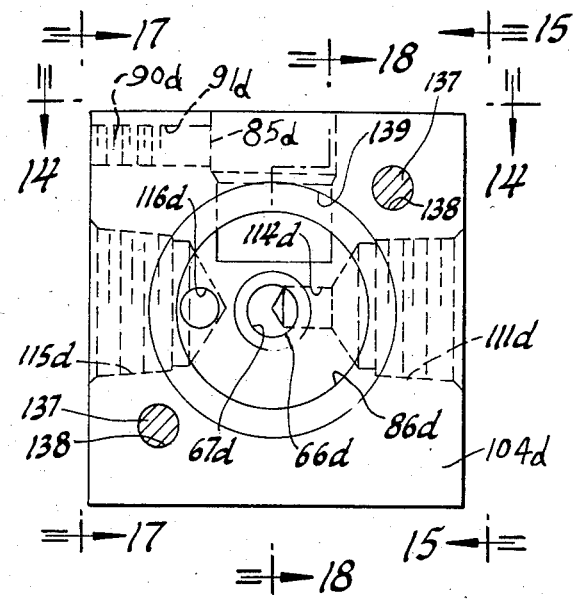
FIG. 13 is a top plan view of the upper body member illustrated in FIG. 12, taken along the line 13—13 thereof, and looking in the direction of the arrows.
Figure 14:
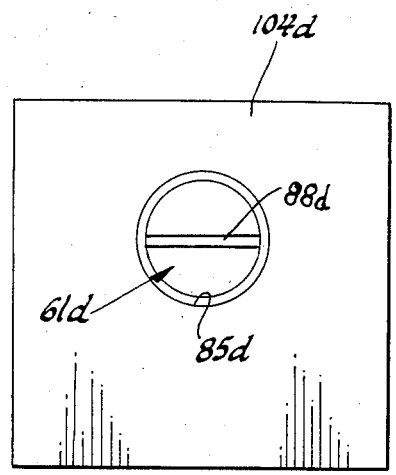
FIG. 14 is a rear elevation view of the upper body member illustrated in FIG. 13, taken along the line 14—14 thereof, and looking in the direction of the arrows.
Figure 15:
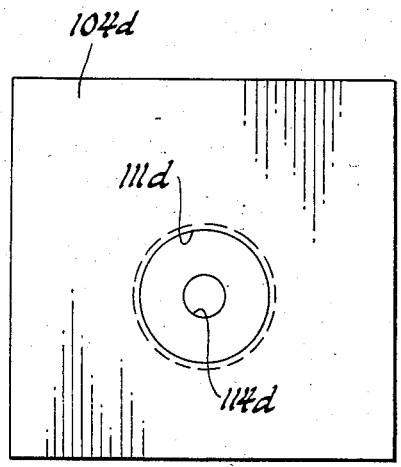
FIG. 15 is a right side elevation view of the upper body member illustrated in FIG. 13, taken along the line 15—15 thereof, and looking in the direction of the arrows.
Figure 16:
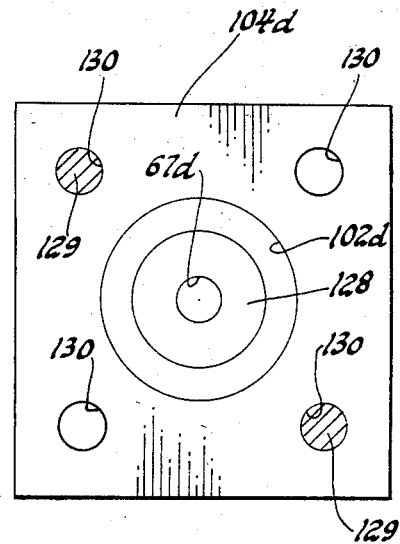
FIG. 16 is a bottom plan view, with parts removed, of the upper body member illustrated in FIG. 12, taken along the line 16—16 thereof, and looking in the direction of the arrows.
Figure 17:
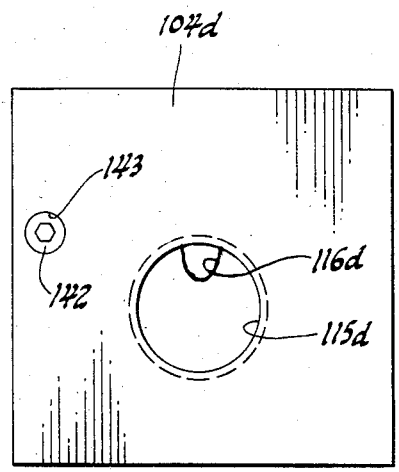
FIG. 17 is a left side elevation view of the upper body member illustrated in FIG. 13, taken along the line 17—17 thereof, and looking in the direction of the arrows.
Figure 18:
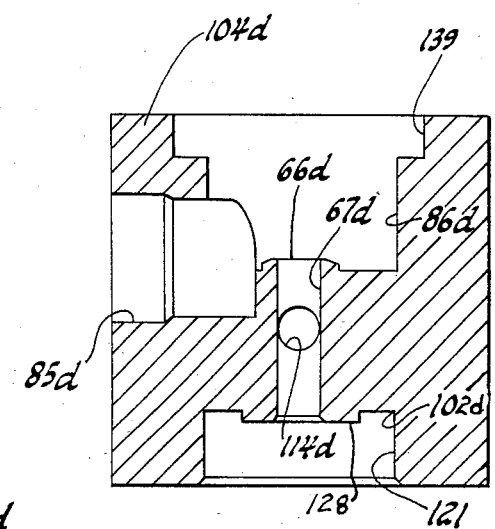
FIG. 18 is an elevation section view of the upper body member structure illustrated in FIG. 13, taken along the line 18—18 thereof, and looking in the direction of the arrows.
Figure 19:
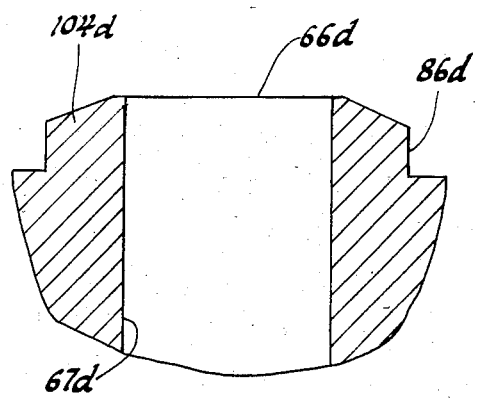
FIG. 19 is a fragmentary, elevation section view of the solenoid upper poppet seat formed in the upper body member.
Figure 20:
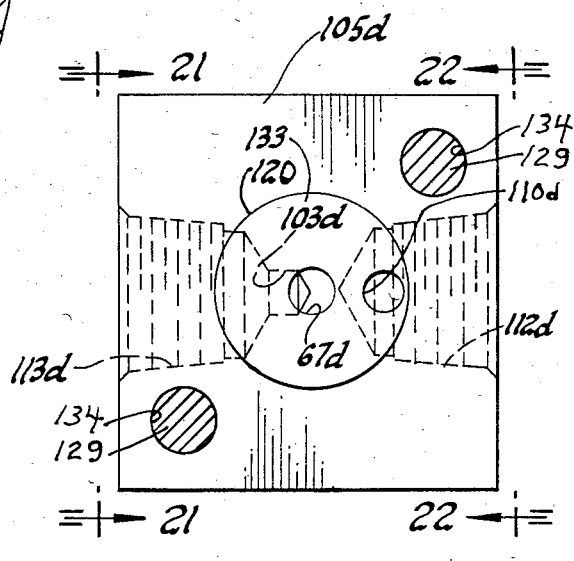
FIG. 20 is a top plan view, with parts removed, of the lower body member illustrated in FIG. 12, taken along the line 20—20 thereof, and looking in the direction of the arrows.
Figure 21:
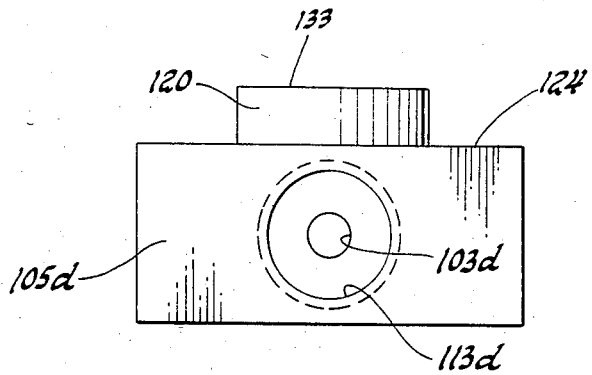
FIG. 21 is a left side elevation view of the lower body member illustrated in FIG. 20, taken along the line 21—21 thereof, and looking in the direction of the arrows.
Figure 22:
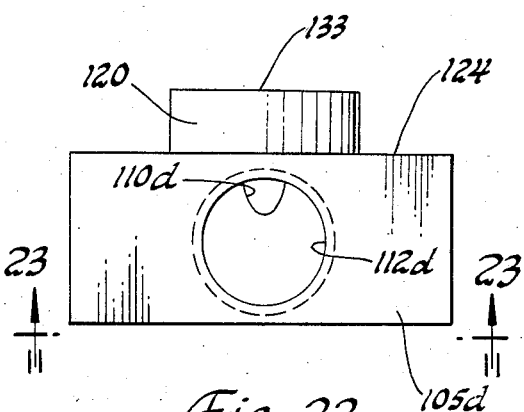
FIG. 22 is a right side elevation view of the lower body member structure illustrated in FIG. 20, taken along the line 22—22 thereof, and looking in the direction of the arrows.
Figure 23:
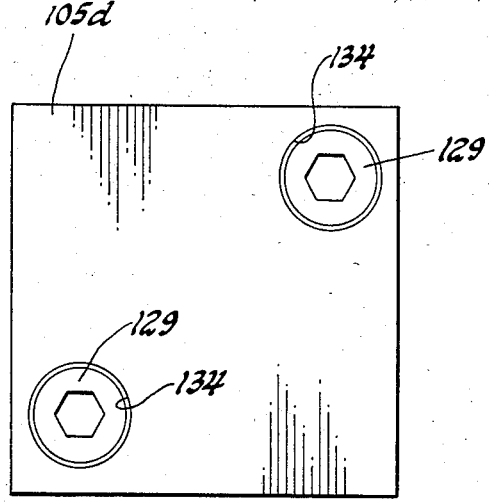
FIG. 23 is a bottom plan view of the lower body member illustrated in FIG. 22, taken along the line 23—23 thereof, and looking in the direction of the arrows.

As best seen in FIGS. 12, 20–22, the valve body lower member 105d is provided with an axial, integral boss or pivot shaft 120 on the upper end thereof. As shown in FIG. 12, the valve body upper member 104d is provided on the lower end thereof with an axial pivot cavity or chamber 121 for the rotatable reception of the boss 120 on the valve body lower member 105d. A suitable O-ring seal 122 is operatively mounted between the lower end of the boss 120 and the outer end of the bore or pivot cavity 121. In the assembled condition shown in FIG. 12, the lower end 123 of the valve body upper member 104d is rotatably and slidably seated on the upper surface 124 of the valve body lower member 105d. As shown in FIG. 12, the inner end wall 128 of the annular pivot cavity 121 is spaced apart from the top end 133 of the pivot boss 120, so as to form the fluid transfer passage 102d. As illustrated in FIG. 13, the valve body upper member 104d is detachably connected to the solenoid operator 12d by any suitable means, as by a pair of suitable machine screws 137 which extend from the solenoid operator 12d and downwardly into the threaded bores 138 formed in the valve body upper member 104d. One of the threaded bores 138 is also shown in FIG. 12. As shown in FIGS. 10 and 16, the valve body lower member 105d is releasably secured to the valve body upper member 104d by a pair of suitable machine screws 129, which are adapted to pass through threaded holes or bores 134 (FIG. 23), formed through the valve body lower member 105d, and into threaded engagement with two of the four threaded bores 130 (FIG. 16), which are formed in the lower end of the valve body upper member 104d. As shown in FIGS. 12, 13 and 18, the numeral 139 designates a recess or bore for the reception of the lower end of the solenoid operator 12d.

The four-way valve embodiment of FIGS. 10 through 23 functions in the same manner as described hereinbefore for the previous embodiment of FIGS. 8 and 9. However, the embodiment of FIGS. 10 through 23 is more flexible in that the machine screws 129 can be removed from the valve body lower member 105d, and the valve body lower member 105d can then be rotated to any one of four selected positions, for positioning the number two cylinder port 112d and the number two exhaust port 113d in different positions relative to the inlet and number one cylinder ports, 111d and 115d, respectively. The machine screws 129 are then replaced to hold the valve body lower member 105d in the selected position.

A suitable solenoid operator for use in all of the valve embodiments illustrated in FIGS. 1 through 23 is one available on the market from Nass Magnet GmbH, Postfach 43 27, D-3000 Hannover 1, under the designation of TYP 0543 02 4.0.

The fluid transfer passage 102, in all of the four-way valve embodiments is also designated in the claims hereafter as an intermediate fluid transfer chamber.

A unique feature of the invention is that the counterbalancing means 72 and solenoid plunger 47 move the same longitudinal travel distance for equal size three-way and four-way valves.

The solenoid plunger 47 in all of the invention embodiments is balanced in the energized position. This unique feature is illustrated in the first embodiment in FIG. 4, by the sealing action diameter 28, which is effected when the upper poppet seal 54 seats on the exhaust passage valve seat 27. The balancing action occurs because the diameter of the axial bore 67 is made equal to the sealing action diameter 28.

What is claimed is:

1. A balanced solenoid operated valve, characterized in that it comprises:
   (a) a valve body having a bore formed in one end thereof, and an axial bore having a diameter smaller than said first named bore formed in said valve body and communicating at one end with and extending axially and longitudinally inward from the first named bore;
   (b) said axial bore having a poppet valve seat formed therearound at the end thereof which communicates with said first named bore;
   (c) a solenoid operatively mounted on said valve body and having a solenoid plunger provided with a first poppet valve seal axially and transversely disposed on one end thereof and a second poppet valve seal axially and transversely disposed on the other end thereof;

(d) said solenoid plunger being movable to a balanced de-energized position by a spring means and to a balanced energized position when the solenoid is energized, and when it is in the de-energized position the first poppot valve seal is seated on the poppet valve seat formed around said end of the axial bore which communicates with said first named bore;

(e) an elongated counter-balancing spool member having one end thereof attached to the end of the solenoid plunger on which the first poppet valve seal is mounted and provided on the other end thereof with a flange means carrying a seal means for sealingly engaging the axial bore;

(f) said valve being provided with cylinder port means and exhaust port means, and a pressurized fluid inlet port and passage connected to said axial bore at a position between the ends of the elongated counter-balancing spool member; and, (g) the flow of pressurized fluid between said ports is selectively effected when the solenoid plunger is in the de-energized and energized positions.

2. A balanced solenoid operated valve, characterized in that it comprises:

(a) a valve body having a bore formed in one end thereof, and an axial bore having a diameter smaller than said first named bore formed in said valve body and communicating at one end with and extending axially and longitudinally inward from the first named bore;

(b) said axial bore having a poppet valve seat formed therearound at the end thereof which communicates with said first named bore;

(c) a solenoid operatively mounted on said valve body and having a solenoid plunger provided with a first poppet valve seal axially and transversely disposed on one end thereof and a second poppet valve seal axially and transversely disposed on the other end thereof;

(d) said solenoid plunger being movable to a balanced de-energized position by a spring means and to a balanced energized position when the solenoid is energized, and when it is in the de-energized position the first poppet valve seal is seated on the poppet valve seat formed around said end of the axial bore which communicates with said first named bore;

(e) an elongated counter-balancing spool member having one end thereof attached to the end of the solenoid plunger on which the first poppet valve seal is mounted and provided on the other end thereof with a flange means carrying a seal means for sealingly engaging the axial bore;

(f) said valve being provided with cylinder port means and exhaust port means, and a pressurized fluid inlet port and passage connected to said axial bore at a position between the ends of the elongated counter-balancing spool member;

(g) the flow of pressurized fluid between said ports is selectively effected when the solenoid plunger is in the de-energized and energized positions; and, (h) said cylinder port means includes at least a first cylinder port formed in said valve body and connected by an exhaust passageway formed through the solenoid to a first exhaust port of said exhaust port means, and when the solenoid plunger is in the de-energized position said first cylinder port is exhausted through said exhaust passageway to said exhaust port, and when the solenoid plunger is moved to the energized position the second poppet valve seal thereon seats on a poppet valve seat formed in said exhaust passageway, in a balanced condition to block flow through the exhaust passageway between said first cylinder port and said first exhaust port and said first poppet valve seal on the solenoid plunger is moved off of the first named poppet valve seat to allow flow of pressurized fluid from said axial bore through a passage in the valve body to the first cylinder port.

3. A balanced solenoid operated valve, as defined in claim 2, characterized in that:

(a) said valve body comprises a valve body upper member and a detachably mounted valve body lower member;

(b) said axial bore comprises a first portion in the valve body upper member, and an axially aligned and longitudinally spaced apart second portion in the valve body lower member, and the longitudinally spaced apart adjacent ends of the first and second axial bore portions communicate with an intermediate fluid transfer chamber, and said pressurized fluid inlet port and passage is connected to the axial bore first portion;

(c) said cylinder port means includes a second cylinder port formed in one of the valve body members and being normally connected to a passageway through the intermediate fluid transfer chamber with the first portion of the axial bore in the valve body upper member when the solenoid is de-energized to receive pressurized fluid from the first portion of the axial bore;

(d) said exhaust port means includes a second exhaust port formed in the valve body lower member and being normally connected to the axial bore second portion and the intermediate fluid transfer chamber when the solenoid is energized; and, (e) said elongated counter-balancing spool member other end with a flange means carrying a seal means is normally positioned with said seal means in the second portion of said axial bore when the solenoid is de-energized, and when the solenoid is energized said counter-balancing spool member seal means is moved across said intermediate fluid transfer chamber and into said first portion of said axial bore, to close off the flow of pressurized fluid from the axial bore and through the intermediate fluid transfer chamber into said second cylinder port, and to connect the second cylinder port through the intermediate fluid transfer chamber and the second portion of the axial bore to said second exhaust port.

4. A balanced solenoid operated valve, as defined in claim 3, characterized in that:

(a) said second cylinder port is formed in the valve body upper member.

5. A balanced solenoid operated valve, as defined in claim 4, characterized in that:

(a) said valve body lower member is rotatably adjustable relative to the valve body upper member.

6. A balanced solenoid operated valve, as defined in claim 3, characterized in that:

(a) said second cylinder port is formed in the valve body lower member.

7. A balanced solenoid operated valve, as defined in claim 6, characterized in that:

(a) said valve body lower member is rotatably adjustable to a selected one of a plurality of positions.

8. A balanced solenoid operated valve, as defined in claim 2, characterized in that:

(a) a manual operator is operatively mounted in said valve body and engageable with the solenoid plunger for moving it from the de-energized position to the energized position.

* * * * *